United States Patent [19]
Sato

[11] Patent Number: 5,836,275
[45] Date of Patent: Nov. 17, 1998

[54] VALVE TIMING CONTROL DEVICE

[75] Inventor: Atsushi Sato, Kariya, Japan

[73] Assignee: Aisin Seiki Kabushiki Kaisha, Aichi-pref., Japan

[21] Appl. No.: 856,979

[22] Filed: May 15, 1997

[30] Foreign Application Priority Data

May 15, 1996 [JP] Japan .................................. 8-120307

[51] Int. Cl.⁶ .............................. F01L 1/344; F01L 13/00
[52] U.S. Cl. ................................. 123/90.17; 123/90.31; 74/568 R; 464/2
[58] Field of Search ............................ 123/90.12, 90.15, 123/90.17, 90.31; 74/567, 568 R; 464/1, 2, 160, 161

[56] References Cited

U.S. PATENT DOCUMENTS

| | | | |
|---|---|---|---|
| 4,858,572 | 8/1989 | Shirai et al. ......................... | 123/90.15 |
| 5,361,735 | 11/1994 | Butterfield et al. ................... | 123/90.17 |
| 5,367,992 | 11/1994 | Butterfield et al. ................... | 123/90.17 |
| 5,666,914 | 9/1997 | Ushida et al. ........................ | 123/90.31 |

*Primary Examiner*—Weilun Lo
*Attorney, Agent, or Firm*—Hazel & Thomas

[57] ABSTRACT

A valve timing control device has a first pressure chamber and a second pressure chamber to rotate vanes mounted on a rotor and a fluid supplying means for supplying fluid under pressure to at least a selected one of the first pressure chamber and the second pressure chamber in order to control valve timing. The device further includes a locking means for connecting a housing member and the rotor and a canceling means for canceling the operation of the locking means. The canceling means cancels the locking means before the fluid supplying means supplies fluid under pressure to the first pressure chamber or the second pressure chamber, so that the locking means is canceled completely before the vanes rotate.

5 Claims, 3 Drawing Sheets

VALVE TIMING CONTROL DEVICE

FIELD OF THE INVENTION

The present invention relates to a valve timing control device and, in particular, to the valve timing control device for controlling an angular phase difference between a crank shaft of a combustion engine and a cam shaft of the combustion engine.

BACKGROUND OF THE INVENTION

In general, the valve timing of an internal combustion engine is determined by valve mechanisms driven by cam shafts according to either a characteristic or a specification of the internal combustion engine. Since a condition of the combustion is charged in response to the rotational speed of the combustion engine, however, it is difficult to obtain an optimum valve timing through the whole rotational range. Therefore, a valve timing control device which is able to charge a valve timing in response to the condition of the internal combustion engine as an auxiliary mechanism of the valve mechanism has been proposed in recent years.

A conventional device of this kind is disclosed, for example, in U.S. Pat. No. 4,858,572. This device includes a rotor which is fixed on the cam shaft, a drive member which is driven by the rotational torque from a crank shaft and rotatably mounted on the cam shaft so as to surround the rotor, a plurality of chambers which are defined between the drive member and the rotor, each of which has a pair of circumferentially opposed walls, a plurality of vanes which are mounted to the rotor and which extend outwardly therefrom in the radial direction into the chambers so as to divide each of chambers into a first pressure chamber and a second pressure chamber, and a pin which is accommodated in a hole of the drive member and able to insert into a hole of the rotor by a coil spring. In this device, a fluid under pressure is supplied to a selected one of the first pressure chamber and the second pressure chamber in response to the running condition of the internal combustion engine. An angular phase difference between the crank shaft and the cam shaft is controlled so as to advance or retard the valve timing relative to the crank shaft. The fluid under pressure is delivered from an oil pump. The valve timing control device is in the position of the maximum advanced condition, when each of the vanes contacts with one of the opposed walls of each of the chambers. On the other hand, the valve timing control device is in the position of the maximum retarded condition, when each of the vanes contacts with the other of the opposed walls of each of the chambers.

When the valve timing control device is in the position of the maximum retarded condition, the pin is inserted in the hole of the rotor by the coil spring. If the valve timing control device changes up the advanced condition from the portion of the maximum retarded condition, the pin is pulled out from the hole of the rotor by the fluid under pressure against the coil spring.

In the above mentioned prior art device, when the valve timing control device changes up the advanced condition from the portion of the maximum retarded condition, a part of the fluid under pressure supplied to the first and second pressure chambers which make the vanes rotate in order to advance the valve timing is also supplied to the chamber which makes the pin be pulled out from the hole against the coil spring. Accordingly, the fluid under pressure works at the chambers for rotating the vanes and at the same time the chamber for pulling out the pin. When the fluid pressure in the chambers for rotating the vanes is high enough to start rotating the vanes before the pin is pulled out from the hole completely, the rotor pushes the pin to the wall of the hole. The pin may stick in the hole and not come out from the hole. This causes the vanes not to be able to rotate.

SUMMARY OF THE INVENTION

Accordingly, it is an object of the present invention to provide an improved valve timing control device without the foregoing drawbacks.

In accordance with the present invention, a valve timing control device comprises, a rotor fixed on a cam shaft of an engine, a housing member rotatably mounted on the cam shaft so as to surround the rotor, a chamber defined between the housing member and the rotor and having a pair of circumferentially opposed walls, a vane mounted on the rotor and extended outwardly therefrom in the radial direction into the chamber so as to divide the chamber into a first pressure chamber and a second pressure chamber, a fluid supplying means for supplying fluid under pressure to at least a selected one of the first pressure chamber and the second pressure chamber, a locking means for connecting the housing member and the rotor, and a canceling means for canceling the locking means, before the fluid supplying means supplies fluid under pressure to the first pressure chamber or the second pressure chamber.

In accordance with the present invention, a canceling means cancels the locking member before the fluid supplying means supplies the fluid under pressure to rotate the vanes so that the pin is pulled out from the hole completely before the vanes rotate.

Other objects and advantages of invention will become apparent during the following discussion of the accompanying drawings.

BRIEF DESCRIPTION OF THE DRAWING FIGURES

The foregoing and additional features of the present invention will become more apparent from the following detailed description of preferred embodiments thereof when considered with reference to the attached drawings, in which.

DETAILED DESCRIPTION OF THE PREFERRED EMBODIMENTS

A valve timing control device in accordance with preferred embodiment of the present invention will be described with reference to the attached drawings.

Figure 1:
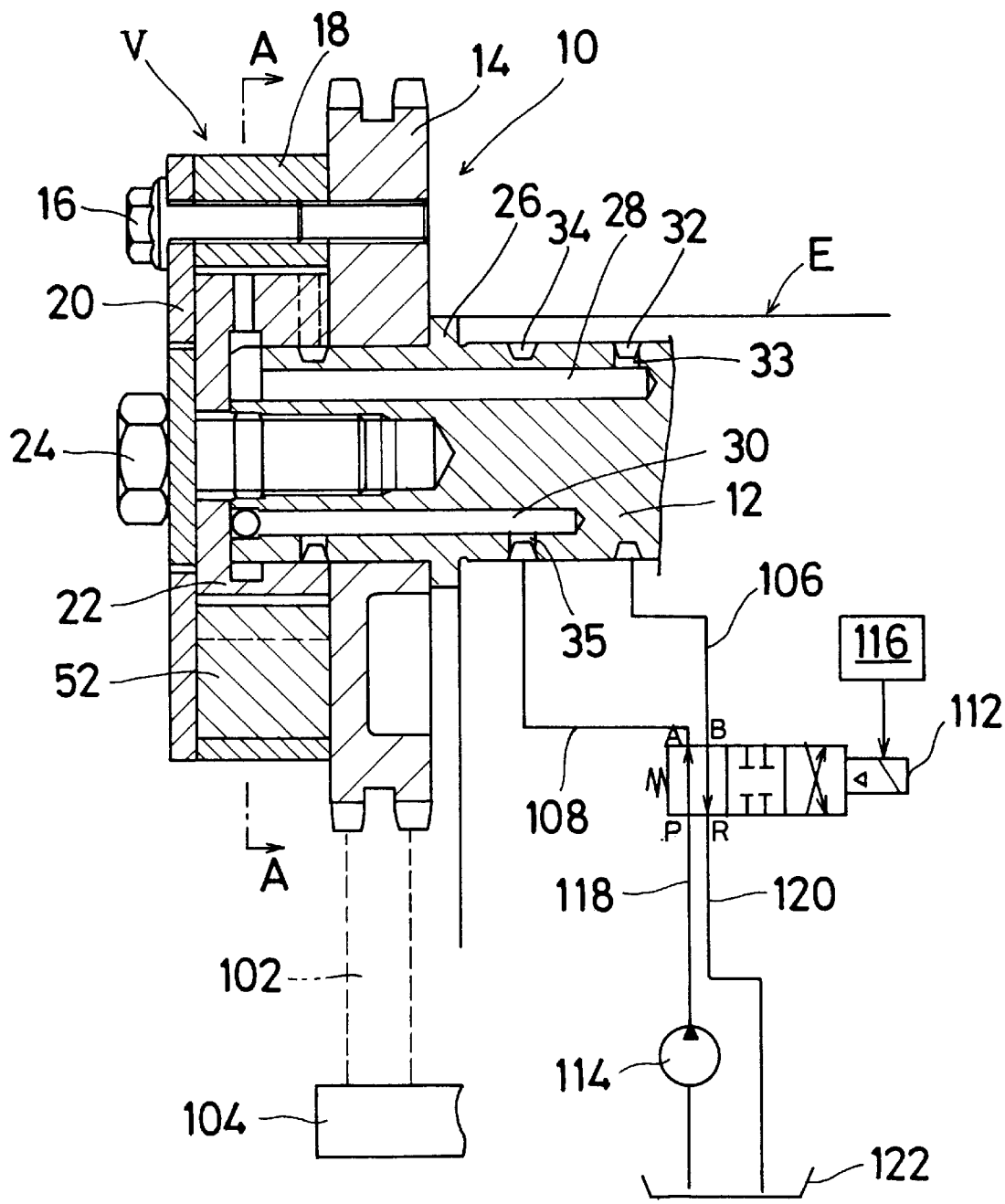
FIG. 1 is a sectional view of the embodiment of a valve timing control device in accordance with the prevent invention.
Figure 2:
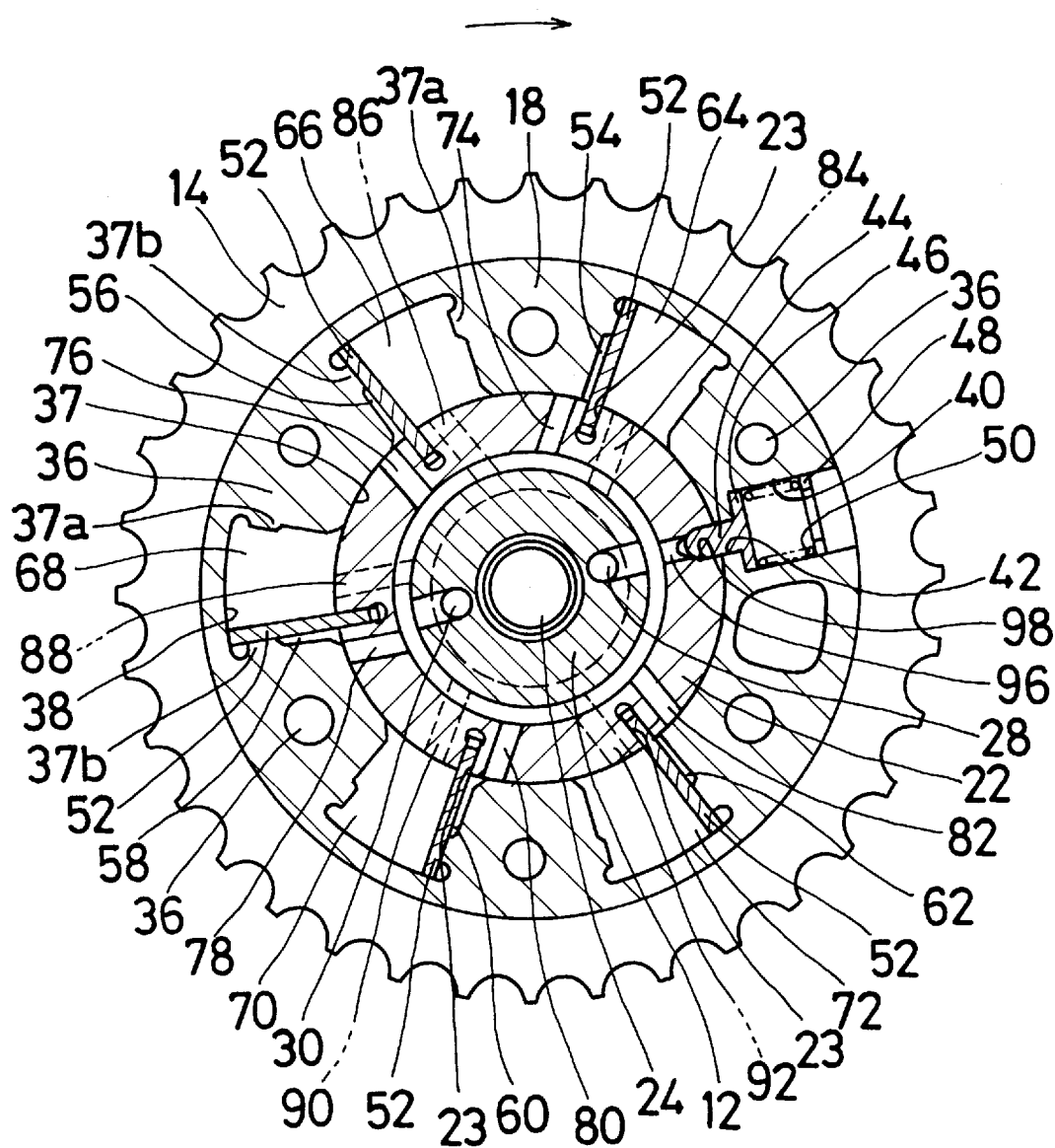
FIG. 2 is a section taken along the line A—A in FIG. 1 in accordance with the present invention.
Figure 3:
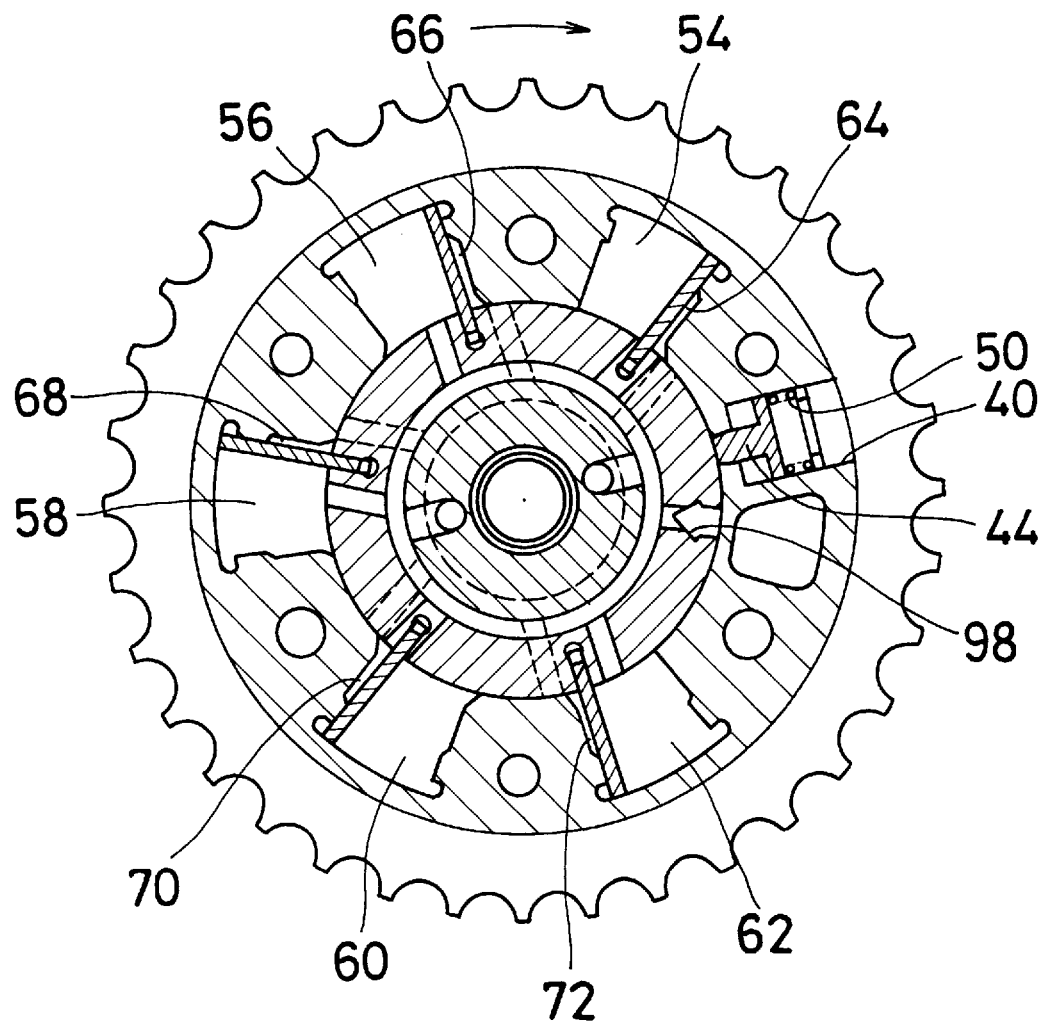
FIG. 3 is a view similar to FIG. 2, showing various modifications.

FIGS. 1 to 3 show an embodiment of the present invention. Referring to FIG. 1, a valve timing control device 10 of the embodiment includes an exhaust cam shaft 12, a rotor 22, a plurality of vanes 52 and a housing 18. The exhaust cam shaft 10 is rotatably mounted on a cylinder head 100 of an engine E. The exhaust cam shaft 12 has two circular groves 32, 34. Both the circular grooves 32, 34 are formed so as to maintain a predetermined distance between each other. The rotor 22 is fixed to the projecting end of the exhaust cam shaft 12 by a bolt 24. The rotor 22 has a plurality of grooves for inserting the vanes 52 as shown in FIGS. 2 and 3. One side end of the housing 18 is fixed to a timing pulley 14 and the other side end of the housing 18 is fixed to a side plate 20 by a bolt 16. Therefore, the housing 18, the timing pulley 14 and the side plate 20 act as a single body. Rotational torque is transmitted via a belt 102 (or a chain 102) from a crank shaft 104 which is rotated by the engine E. A pin 44 is able to connect between the rotor 22 and the housing 18 when the rotor 22 is in phase with the housing 18.

The exhaust cam shaft 12 has a plurality of cams (not shown). Each cam makes the exhaust valves open and close. There are two passages 28, 30 which are formed in the exhaust cam shaft 12 and extend in the axial direction. One end of the passage 28 communicates with the circular groove 32 through a passage 33. The circular groove 32 communicates with a passage 106 which is formed in the cylinder head 100 of an engine E. On the other hand, one end of the passage 30 communicates with the circular groove 34 through a passage 35. The circular groove 34 communicates with a passage 108 which is formed in the cylinder head 100 of an engine E. Both passages 106 and 108 communicate with a fluid supplying device. The fluid supplying device is comprised of a changeover valve 112, a fluid pump 114 and a controller 116. In this embodiment, the changeover valve 112 is a four port-three position type electromagnetic valve. The fluid pump 114 is driven by the engine E and discharges the fluid (e.g., oil) for lubricating the engine E. The pump 114 may be a pump for lubricating the engine E. The passage 108 is connected to a port A of the changeover valve 112 and the passage 106 is connected to a port B of the changeover valve 112. A port P of the changeover valve 112 communicates with a discharge portion of the fluid pump 114 via a passage 118 and a port R of the changeover valve 112 communicates with a reservoir 122 via a passage 120. The portion of the changeover valve 112 is controlled by the controller 116 so that a first condition as shown in FIG. 1 in which the discharged fluid from the pump 114 is supplied to the passage 108 and in which the passage 106 communicates with the reservoir 122, a second condition in which all the ports A, B, P, R are interrupted, a third condition in which the discharged fluid from the pump 114 is supplied to the passage 106 and in which the passage 108 communicates with the reservoir 122 are selectively obtained. The controller 116 controls the above conditions of the changeover valve 112 based on parameter signals such as engine speed, the opening level of a throttle valve (not shown) and so on.

In the rotor 22 and the housing 18, a valve timing control mechanism V is mounted therein. The rotor 22 has a cylindrical shape. As shown in FIGS. 2 and 3, the housing 18 has an inner bore 37 and is rotatably mounted on the outer circumferential surface of the rotor 22 so as to surround the rotor 22. The housing 18 has the same axial length as the rotor 22 and is provided with five grooves 38 which are outwardly extended from the inner bore 37 in the radial direction and which are separated in the circumferential direction at regular intervals. The housing 18 is also provided with a plurality of holes 36 for penetration by the bolt 16. The holes 36 penetrate in the axial direction and are separated in the circumferential direction at regular intervals.

There are five chambers which are made of the grooves 38. The chambers are separated in the circumferential direction at regular intervals, and each has a pair of circumferentially opposed walls 37a and 37b. Therefore, each chamber is defined along the rotor 22, the housing 18, the timing pulley 14 and the side plate 20. On the outer circumferential portion of the rotor 22, there are five grooves 23. The number of the grooves 23 is equal to the number of the chambers. Each of the grooves 23 extends inwardly therefrom in the radial direction and each is separated in the circumferential direction at regular intervals. Each of the vanes 52 that extend outwardly in a radial direction into each of the chambers is mounted in each of the grooves 23, respectively. Thereby, each of chambers is divided into a first pressure chamber 54, 56, 58, 60, 62 and a second pressure chamber 64, 66, 68, 70, 72, both of which are fluid tightly separated from each other.

The housing 18 has a hole 50 which extends inwardly thereof in the radial direction and which penetrates in the radial direction. The bottom end of the hole 50 has a small hole portion 42. The small hole portion 42 is able to accommodate a pin 44 which is pushed forward into the rotor 22 by a coil spring 40. The pin 44 has a large diameter portion 46 which is engaged in the hole 50. The coil spring 40 is supported in the hole 50 by a clip 48. On the other hand, the rotor 30 on the outer circumferential surface has a hole 98 which extends inwardly thereof in the radial direction so as to be insertable by the pin 44.

The rotor 22 is provided with five first passages 74, 76, 78, 80, 82, five second passages 84, 86, 88, 90, 92 and a passage 96. The first passages and the passage 96 are connected. One end of each of the first passages 74, 76, 78, 80, 82, communicates with the passage 28. The other end of the first passages 76, 78, 80 communicates with each of the first chambers 56, 58, 60. However, when the vanes 52 are in contact with the walls 37b as shown in FIG. 2, the other end of the first passage 74 and 82 is not able to communicate with the first chambers 54 and 62. The other end of the first passage 74 and 82 is able to communicate with the first chambers 54 and 62 if the vanes 52 are not in contact with the walls 37b. On the other hand, one end of each of the second passages 84, 86, 88, 90, 92 communicates with the passage 30 and the other end of the second passages 84, 86, 88, 90, 92 communicates with each of the second chambers 64, 66, 68, 70, 72.

The operation of the valve timing control device having the above structure will now be described.

The exhaust camshaft 12 is rotated clockwise by timing pulley 14. Thereby, exhaust valves (not shown) are opened and closed. The pressure of fluid delivered from the oil pump 114 is increased. Fluid under the resulting pressure is supplied to the changeover valve 112. At that time, the changeover valve 112 is in the first condition as shown in FIG. 1, and fluid is supplied to the second chambers 64, 66, 68, 70 and 72 via the passage 108, the passage 30 and second passages 84, 86, 88, 90 and 92. Thereby, the vanes 52 are rotated in the counterclockwise direction, together with the rotor 22 and the exhaust camshaft 12. Upon fitting of the pin 44 into the hole 98 of the rotor 22, such rotation is terminated. Thus, the exhaust cam shaft 20 is retarded through an angle relative to the crank shaft 104.

On the other hand, for returning the exhaust camshaft 12 from the retarded condition to the advanced condition, the vanes 52 are rotated in the clockwise direction. The changeover valve 112 is changed into the third portion and supplying fluid under pressure to the first passages 74, 76, 78, 80, 82 via the passage 106 and the passage 28. Since the first passages 74, 76, 78, 80, 82 communicate with the passage 96, fluid under pressure supplied into the hole 98 urges the pin 44 fully into the hole 50 of the housing 18. At the same time, fluid under pressure is supplied into the first chamber 56, 58 and 60 from the first passage 76, 78, 80.

After the pin 44 is retracted into the hole 50 and the vanes 52 are little rotated in the clockwise direction, fluid under pressure is supplied into the first chamber 54 and 62 from the first passage 74 and 82. Therefore, releasing the connection between the rotor 22 and the housing 18 before pressure is increased in the first chambers 54, 56, 58, 60 and 62 so as to make the vanes 52 rotate in the clockwise direction as shown in FIG. 3. During the retarding rotary movement of the vanes 52, fluid in each second chambers 64, 66, 68, 70, 72 is drained to the reservoir 122 through the passage 30, the passage 108, second passages 84, 86, 88, 90, 92 and the changeover valve 112.

While the invention has been described in connection with one of its preferred embodiments, it should be understood that changes and modifications may be made without departing from the spirit and scope of the appended claims.

What is claimed is:

1. A valve timing control device comprising:

a rotor fixed on a cam shaft of an engine;

a housing member rotatably mounted on the cam shaft so as to surround the rotor;

a plurality of chambers defined between the housing member and the rotor and having a pair of circumferentially opposed walls, respectively;

a plurality of vanes provided on the rotor and extended outwardly therefrom in a radial direction into the chambers so as to divide the chambers into a first pressure chamber and a second pressure chamber, respectively;

a fluid supplying means for supplying fluid under pressure to at least a selected one of the first pressure chambers and the second pressure chambers;

a locking means for connecting the housing member and the rotor, the locking means including a pin which is able to connect the housing member and the rotor;

a canceling means for canceling the locking means, before at least one of the first pressure chamber and the second pressure chamber, which is disposed neighboring the pin, is filled with fluid under pressure by the fluid supplying means.

2. A valve timing control device as claimed in claim 1, wherein the fluid supplying means includes a first fluid passage for supplying fluid under pressure into the first pressure chamber, and a second fluid passage for supplying fluid under pressure into the second pressure chamber.

3. A valve timing control device as claimed in claim 2, wherein the locking means includes a first hole which is formed on either the housing member or the rotor, which accommodates the pin;

a second hole which is formed on the other of the rotor or the housing member;

a coil spring located in the first hole for pushing the pin toward the second hole; and a third pressure chamber supplying a fluid under pressure to the pin so as to return the pin to the first hole against the coil spring.

4. A valve timing control device as claimed in claim 3, wherein a part of the pin is insertably positioned in the second hole.

5. A valve timing control device as claimed in claim 4, wherein the canceling means includes an orifice located in the fluid supplying means and is connected to the third pressure chamber.

* * * * *